(12) United States Patent
Kang et al.

(10) Patent No.: US 10,991,366 B2
(45) Date of Patent: Apr. 27, 2021

(54) METHOD OF PROCESSING DIALOGUE QUERY PRIORITY BASED ON DIALOG ACT INFORMATION DEPENDENT ON NUMBER OF EMPTY SLOTS OF THE QUERY

(71) Applicant: SAMSUNG SDS CO., LTD., Seoul (KR)

(72) Inventors: Han Hoon Kang, Seoul (KR); Eun Hye Ji, Seoul (KR); Na Rae Kim, Seoul (KR); Jae Young Yang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 103 days.

(21) Appl. No.: 16/025,456

(22) Filed: Jul. 2, 2018

(65) Prior Publication Data

US 2019/0005951 A1 Jan. 3, 2019

(30) Foreign Application Priority Data

Jun. 30, 2017 (KR) .................. 10-2017-0083161

(51) Int. Cl.
*G10L 15/18* (2013.01)
*G06F 16/9537* (2019.01)
(Continued)

(52) U.S. Cl.
CPC ............. *G10L 15/19* (2013.01); *G06F 40/35* (2020.01); *G10L 15/14* (2013.01);
(Continued)

(58) Field of Classification Search
CPC . G10L 15/1822; G10L 13/02; G06F 16/9537; G06F 16/243; G06F 16/35; G06F 16/313; G06Q 30/0271; G06Q 30/0201
(Continued)

(56) References Cited

U.S. PATENT DOCUMENTS 5,673,362 A * 9/1997 Matsumoto ............. G10L 13/02
704/251
10,223,445 B2 * 3/2019 Suleman .................. G06F 16/35
(Continued)

FOREIGN PATENT DOCUMENTS

KR 10-2014-0000943 A 1/2014
KR 1020170030297 A 3/2017

OTHER PUBLICATIONS

Communication dated Feb. 23, 2021 issued by the Korean Patent Office in application No. 10-2017-0083161.
(Continued)

*Primary Examiner* — Farzad Kazeminezhad
(74) *Attorney, Agent, or Firm* — Sughrue Mion, PLLC

(57) ABSTRACT

A method, performed by a dialogue processing device, of processing dialogue associated with a user based on dialog act information, the method comprises receiving speech information, corresponding to speech of the user, including a plurality of sentence units; identifying a first sentence unit and a second sentence unit, of the plurality of sentence units, based on receiving the speech information; extracting a first dialog act indicative of an intention of the first sentence unit and extracting a second dialog act indicative of an intention of the second sentence unit; extracting a first dialog act indicative of an intention of the first sentence unit and extracting a second dialog act indicative of an intention of the second sentence unit; processing the first sentence unit and the second unit in a sequence according to respective priority orders assigned based on a number of empty slots of dialogue frames of the sentence units.

19 Claims, 13 Drawing Sheets

(51) Int. Cl.
*G06Q 30/02* (2012.01)
*G06F 16/35* (2019.01)
*G10L 13/02* (2013.01)
*G10L 15/19* (2013.01)
*G10L 15/14* (2006.01)
*G10L 15/22* (2006.01)
*G10L 15/26* (2006.01)
*G06F 40/35* (2020.01)

(52) U.S. Cl.
CPC .......... *G10L 15/1815* (2013.01); *G10L 15/22* (2013.01); *G10L 15/26* (2013.01)

(58) Field of Classification Search
USPC ........................................ 704/235, 246, 251
See application file for complete search history.

(56) References Cited

U.S. PATENT DOCUMENTS 10,614,109 B2 * 4/2020 Baughman ............ G06F 16/313
2014/0222503 A1 * 8/2014 Vijayaraghavan ........................... G06Q 30/0201 705/7.29
2015/0088894 A1 * 3/2015 Czarlinska ............ G06F 16/243 707/738
2015/0193447 A1 * 7/2015 Voinea ................ G06F 16/9537 707/767
2015/0287410 A1 * 10/2015 Mengibar .......... G06Q 30/0271 704/246
2015/0348551 A1 * 12/2015 Gruber ................ G10L 15/1822 704/235

OTHER PUBLICATIONS

Kim, S.-J., et al., "Korean Speech Act Tagging using Previous Sentence Features and Following Candidate Speech Acts", Journal of KISS: Software and Applications, vol. 35, No. 6, 2008, pp. 374-385 (13 pages).

Sim, K.-B., et al., "Analyzing the element of emotion recognition from speech", Journal of Korean Institute of Intelligent Systems, vol. 11, No. 6, 2001, pp. 510-515 (7 pages).

* cited by examiner

FIG. 5

| DIALOG ACT | DESCRIPTION |
|---|---|
| NOTIFICATION | INFORMATION PROVISION |
| REQUEST | ACT REQUEST |
| QUERY | INFORMATION REQUEST |
| RESPONSE | INFORMATION CONFIRMATION |

FIG. 6

| FIRST STEP | SECOND STEP |
|---|---|
| QUESTION | WH-QUESTION |
| | Y/N-QUESTION |
| | CONFIRMATION OF PREVIOUS QUESTION |

| SENTENCE#1 DIALOG ACT | SENTENCE#2 DIALOG ACT | DIALOGUE PROCESSING |
|---|---|---|
| NOTIFICATION | QUESTION | QUESTION -> NOTIFICATION |
| NOTIFICATION | REQUEST | REQUEST -> NOTIFICATION |
| NOTIFICATION | NOTIFICATION | QUERY |
| REQUEST#1 | REQUEST#2 | REQUEST#1 -> REQUEST#2 |
| QUESTION#1 | QUESTION#2 | QUESTION#1 -> QUESTION#2 |

| TOPIC | QUERY ABOUT DELIVERY |
|---|---|
| PRODUCT | TV |
| TIME | YESTERDAY |
| ORDERER | - |
| DISTRIBUTOR | - |

| POSITIVE | NEGATIVE |
|----------|-----------|
| GOOD | BAD |
| EASY | DIFFICULT |
| NICE | BAD |
| ... | ... |

FIG. 17B

| POSITIVE | SCORE | NEGATIVE | SCORE |
|---|---|---|---|
| GOOD | +1 | BAD | -1 |
| EASY | +0.9 | DIFFICULT | -0.9 |
| NICE | +0.95 | BAD | -0.95 |
| ... | ... | ... | ... |

METHOD OF PROCESSING DIALOGUE QUERY PRIORITY BASED ON DIALOG ACT INFORMATION DEPENDENT ON NUMBER OF EMPTY SLOTS OF THE QUERY

This application claims the benefit of Korean Patent Application No. 10-2017-0083161, filed on Jun. 30, 2017, in the Korean Intellectual Property Office, the disclosure of which is incorporated herein by reference in its entirety.

BACKGROUND

1. Field of the Disclosure

The present disclosure relates to a method of processing a dialogue on the basis of dialog act information, and more particularly, to a device and method for processing a user's speech including a plurality of sentences by using dialog act information implied in each sentence.

2. Description of the Related Art

Many companies run call centers as a part of customer service, and the sizes of the call centers are increasing with the growth of their business. In addition to this, systems are under construction to complement call centers in various forms on the basis of information technology (IT). An example of such a system is an automatic response service (ARS) system.

Recently, with the maturation of artificial intelligence (AI) and big data technologies, intelligent ARS systems in which call center agents are replaced by intelligent agents, such as chatbots, are being constructed. In intelligent ARS systems, a speech of a user is converted into a textual sentence of speech, and an intelligent agent interprets the content of the user's query by analyzing the speech sentence and automatically provides a response to the query.

However, many sentences may be included in a speech of a user, and the intention in a user's speech is not clearly exposed in many cases. Therefore, it is very difficult for an intelligent agent to accurately detect the main content of a user's query. In particular, although the content of a query intended by a user may be included at the end of a speech, an intelligent agent may sequentially respond to each sentence included in the speech. In this case, the user's satisfaction may be considerably reduced.

Consequently, there is a necessity for a method of determining a priority order for each sentence in a user's speech which includes a plurality of sentences in consideration of the intention in the user's speech, and processing the speech sentences in an appropriate sequence according to priority orders thereof.

SUMMARY

Aspects of the present disclosure provide a method of processing a user's speech composed of a plurality of sentences in consideration of the intention in the speech, and a device for performing the method.

Aspects of the present disclosure also provide a method of determining a priority order for processing each sentence in consideration of the intention in a user's speech in order to process the speech composed of a plurality of sentences, and a device for performing the method.

It should be noted that objects of the present disclosure are not limited to the above-described objects, and other objects of the present disclosure will be apparent to those skilled in the art from the following descriptions.

According to an aspect of the present disclosure, there is provided s a method, performed by a dialogue processing device, of processing dialogue associated with a user based on dialog act information, the method comprising receiving speech information, corresponding to speech of the user, including a plurality of sentence units; identifying a first sentence unit and a second sentence unit, of the plurality of sentence units, based on receiving the speech information; extracting a first dialog act indicative of an intention of the first sentence unit and extracting a second dialog act indicative of an intention of the second sentence unit; determining respective priority orders for the first and second sentence units based on the first and second dialog acts; and processing the first sentence unit and the second sentence unit in a sequence according to the respective priority orders.

According to another aspect of the disclosure, there is provided a device comprising: a memory configured to store instructions; and at least one processor configured to execute the instructions to: receive speech information, corresponding to speech of a user, including a plurality of sentence units; identify a first sentence unit and a second sentence unit, of the plurality of sentence units, based on receiving the speech information; extract a first dialog act indicative of an intention of the first sentence unit and a second dialog act indicative of an intention of the second sentence unit; determine respective priority orders for the first and second sentence units based on the first and second dialog acts; and process the first and second sentence units in a sequence according to the respective priority orders.

According to another aspect of the disclosure, there is provided non-transitory computer-readable medium configured to store one or more instructions that, when executed by one or more processors, cause the one or more processors to: receive speech information, corresponding to speech of a user, including a plurality of sentence units; identify a first sentence unit and a second sentence unit based on the speech information; extract a first dialog act indicative of an intention of the first sentence unit and extract a second dialog act indicative of an intention of the second sentence unit; determine respective priority orders for the first and second sentence units based on the first and second dialog acts; and process the first and second sentence units in a sequence according to the respective priority orders.

BRIEF DESCRIPTION OF THE DRAWINGS

The above and other aspects and features of the present disclosure will become more apparent by describing in detail exemplary embodiments thereof with reference to the attached drawings, in which:

FIGS. 5 and 6 show exemplary types of dialog acts which may be referred to in some embodiments of the present disclosure;

FIGS. 16 to 17B are diagrams illustrating a sentiment analysis-based importance evaluation method which may be referred to in some embodiments of the present disclosure.

DETAILED DESCRIPTION OF THE EMBODIMENTS

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Prior to the description of this specification, some terms used in this specification will be defined.

In this specification, a dialog act or a speech act denotes the intention of a user's speech implied in a speech sentence. For example, the types of dialog acts may include a request dialog act for requesting act processing, a notification dialog act for providing information, a question dialog act for requesting information, and the like. However, the types of dialog s are not limited thereto, and there are various ways of classifying dialog acts.

Hereinafter, some exemplary embodiments of the present disclosure will be described in detail with reference to the accompanying drawings.

Figure 1:
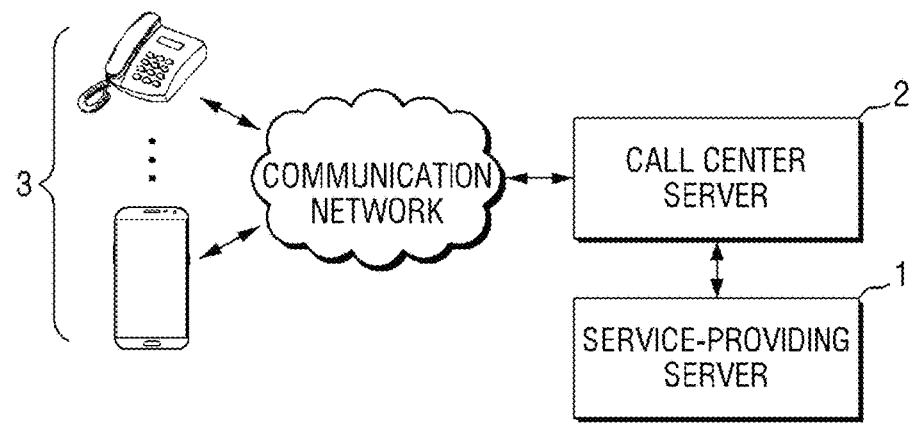
FIG. 1 is a diagram showing a configuration of an intelligent automatic response service (ARS) system according to an exemplary embodiment of the present disclosure.

FIG. 1 shows an intelligent automatic response service (ARS) system according to an exemplary embodiment of the present disclosure.

An intelligent ARS system denotes a system which provides an ARS user's query by using an intelligent agent such as a chatbot. Although the intelligent ARS system of FIG. 1 shows a case in which call center agents are completely replaced by an intelligent agent by way of example, some call center agents may assist the intelligent ARS system to provide a smooth response service.

In the present embodiment, the intelligent ARS system may be configured to include a call center server 2, a user terminal 3, and a service-providing server 1. However, this is only an exemplary embodiment for achieving an object of the present disclosure, and it is self-evident that some components may be added or removed as necessary. The respective components of a dialogue processing system shown in FIG. 1 represent functional elements which are functionally divided, and it is to be noted that one or more components may be integrally implemented in an actual physical environment.

In this exemplary embodiment, the user terminal 3 is a terminal used by a user to receive the ARS. For example, the user may make a phone call to the call center server 2 through the user terminal 3, speak the content of a query, and receive the content of a response provided by the service-providing server 1 through a voice.

The user terminal 3 is a device having a means for voice calling and may be, for example, a mobile communication terminal including a smart phone, a wired/wireless phone, and the like. However, the user terminal 3 is not limited thereto, and may include any kind of device having a means for voice calling.

In the present embodiment, the call center server 2 denotes a server device which provides a voice call function to a plurality of user terminals 3. The call center server 2 establishes voice call connections with the plurality of user terminals 3, and transfers, to the service-providing server 1, vocal data indicating the content of the query which is spoken by the user during a voice call process. Also, the call center server 2 provides the user terminal 3 with vocal data which is provided by the service-providing server 1 and indicates the content of the response to the content of the query.

In the present embodiment, the service-providing server 1 is a computing device which provides the ARS to a user. The computing device may be a desktop computer, a laptop computer, and the like. However, the computing device is not limited thereto, and may include any kind of device having a computing means and a communication means. Here, the service-providing server 1 may be implemented as a high-performance server computing device to provide a smooth service. For reference, FIG. 1 shows that the service-viding server 1 is a single computing device, but the service-providing server 1 may be implemented as a system including a plurality of computing devices. Detailed functions of the service-providing server 1 will be described with reference to FIG. 2.

In the present embodiment, the user terminal 3 and the call center server 2 may perform a voice call via a network. The network may be configured according to any communication method, such as a wired method, a wireless method, etc., and configured as various communication networks, such as a wired/wireless public switched telephone network, a personal area network (PAN), a local area network (LAN), a metropolitan area network (MAN), a wide area network (WAN), and the like.

An intelligent ARS system according to an exemplary embodiment of the present disclosure has been described above with reference to FIG. 1. Next, a configuration and operation of the service-providing server 1 which provides an intelligent ARS will be described with reference to FIG. 2.

Figure 2:
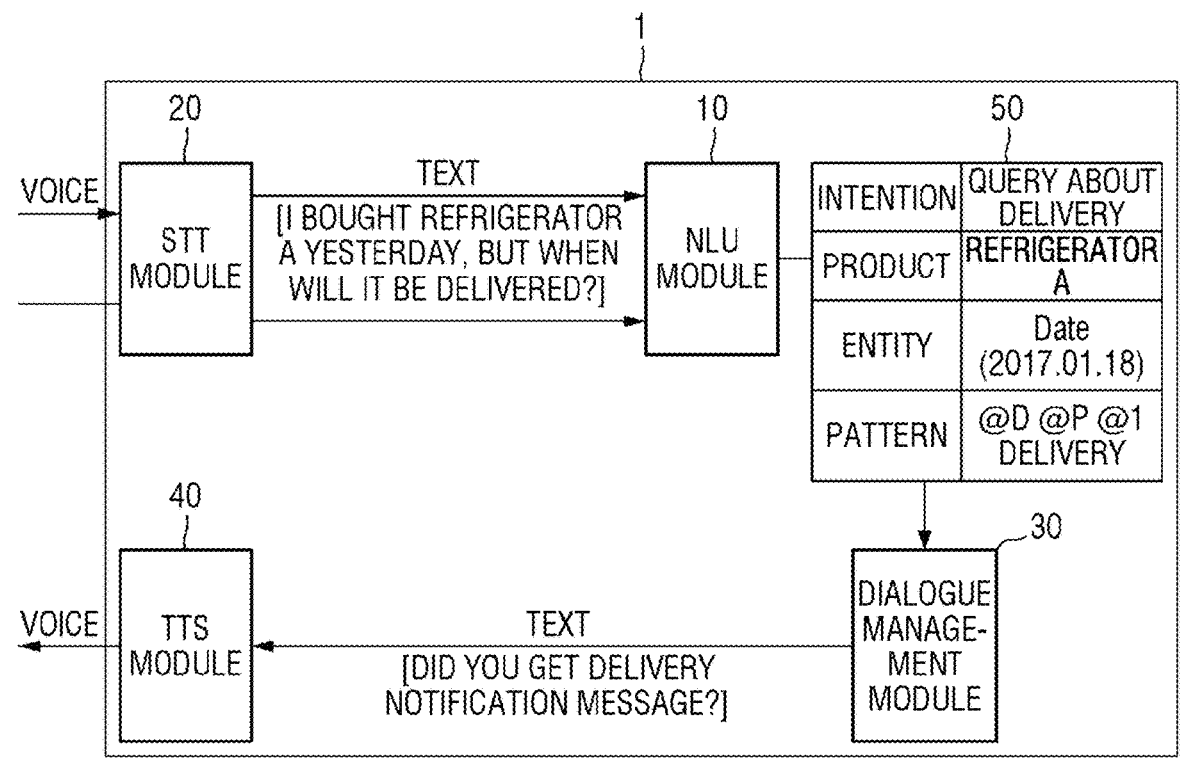
FIG. 2 is a block diagram showing a service-providing server which is a component of the intelligent ARS system.

FIG. 2 is a block diagram showing the service-providing server 1 according to another exemplary embodiment of the present disclosure.

Referring to FIG. 2, for example, when the content of a user's query "I bought refrigerator A yesterday, but when will it be delivered?" is input as vocal data, the service-providing server 1 may provide vocal data, such as "Did you get a delivery notification message?," in response to the query.

To provide such an ARS, the service-providing server 1 may be configured to include a speech-to-text (STT) module 20, a natural language understanding (NLU) module 10, a dialogue management module 30, and a text-to-speech (TTS) module 40. However, only components related to exemplary embodiments of the present disclosure are shown in FIG. 2. Therefore, those of ordinary skill in the art to which the present disclosure pertains would appreciate that general-purpose components other than those shown in FIG. 2 may also be included. Respective components of the service-providing server 1 shown in FIG. 2 represent functional elements which are functionally divided. It is to be noted that one or more components may be integrally implemented in an actual physical environment and each component may be implemented by a separate device. Each component will be described below.

The STT module 20 recognizes and converts a speech made by a user into text speech sentences. To this end, the STT module 20 may use at least one speech recognition algorithm which is widely known in the corresponding technical field. FIG. 2 shows an example in which a speech of a user related to a query about delivery is converted into text speech sentences.

The NLU module 10 detects the content of the user's speech by analyzing the text speech sentences. To this end, the NLU module 10 may perform natural language processing, such as linguistic preprocessing, morpheme and syntax analysis, dialog act analysis, and the like.

The dialogue management module 30 generates a response sentence appropriate for the situation on the basis of a dialogue frame 50 generated by the NLU module 10. To this end, the dialogue management module 30 may be configured to include an intelligent agent, such as a chatbot.

According to an exemplary embodiment of the present disclosure, when a speech including a plurality of sentences is input, the NLU module 10 and/or the dialogue management module 30 divides the speech into sentence units and analyzes a dialog act implied in each sentence. Then, the NLU module 10 and/or the dialogue management module 30 may determine a priority order for processing each sentence on the basis of dialog act analysis results and process each sentence according to the determined priority order rather than according to a sequence of sentences. In such an exemplary embodiment, the NLU module 10 and/or the dialogue management module 30 may be integrated and named as a dialogue processing module, and a computing device in which the dialogue processing module is installed may be named as a dialogue processing device 100. The dialogue processing device 100 will be described in detail below with reference to FIGS. 3 to 12.

The TTS module 40 converts the text response sentence into vocal data. To this end, the TTS module 40 may use at least one speech synthesis algorithm which is widely known in the corresponding technical field. FIG. 2 shows an example in which a response message for asking whether a delivery notification message has been received is converted into a vocal data format.

The service-providing server 1 according to an exemplary embodiment of the present disclosure has been described above with reference to FIG. 2. The dialogue processing device 100 according to another exemplary embodiment of the present disclosure will be described below with reference to FIGS. 3 to 13.

Figure 3:
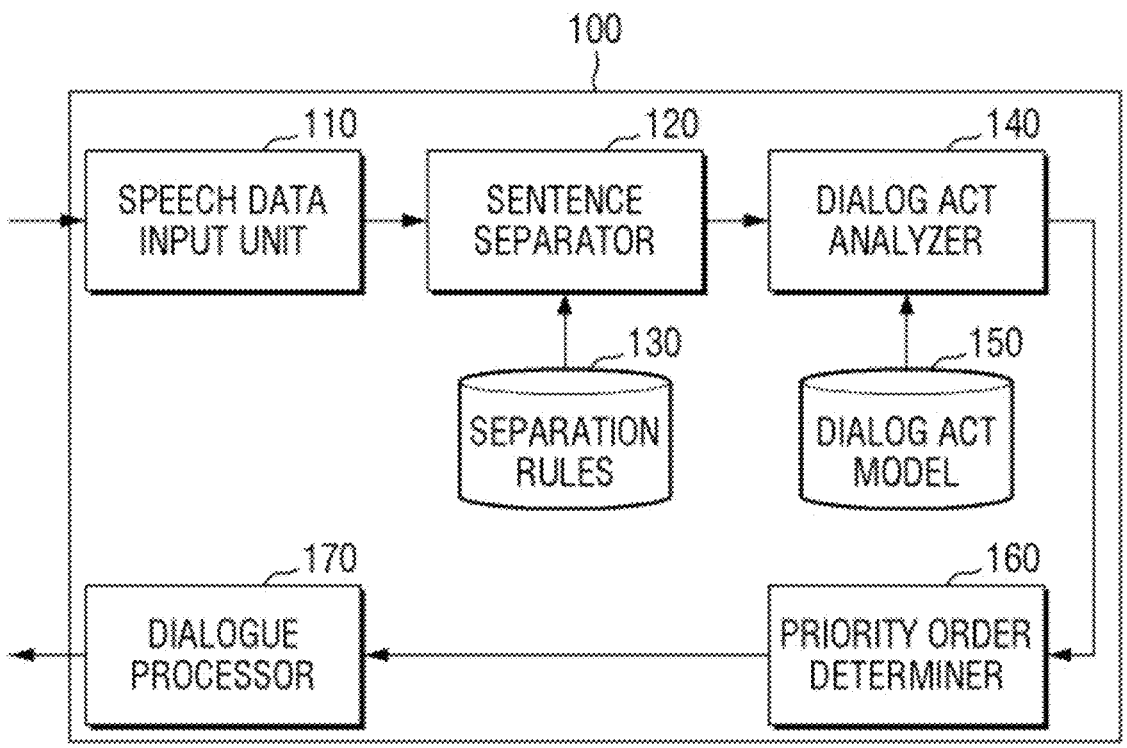
FIG. 3 is a block diagram showing a dialogue processing device according to another exemplary embodiment of the present disclosure.

FIG. 3 is a block diagram showing the dialogue processing device 100 according to the other exemplary embodiment of the present disclosure.

Referring to FIG. 3, the dialogue processing device 100 may be configured to include a speech data input unit 110, a sentence separator 120, a dialog act analyzer 140, a priority order determiner 160, and a dialogue processor 170. However, only components related to exemplary embodiments of the present disclosure are shown in FIG. 3. Therefore, those of ordinary skill in the art to which the present disclosure pertains would appreciate that general-purpose components other than those shown in FIG. 3 may also be included. Respective components of the dialogue processing device 100 shown in FIG. 3 represent functional elements which are functionally divided, and it is to be noted that one or more components may be integrally implemented in an actual physical environment. Each component of the dialogue processing device 100 will be described below.

The speech data input unit 110 receives speech data which indicates data spoken by a user. Here, the speech data may include, for example, vocal data spoken by the user, a text speech, and the like. In particular, according to an exemplary embodiment of the present disclosure, the speech may include a plurality of sentences, and at least one dialog act may be implied in each sentence.

Next, the sentence separator 120 divides the speech including the plurality of sentences into respective sentence units. For example, the sentence separator 120 may divide the speech including two sentences into a first sentence and a second sentence.

According to an exemplary embodiment of the present disclosure, the sentence separator 120 may divide the speech into a plurality of sentence units according to preset separation rules 130. Here, the separation rules 130 may include sentence separation rules which are defined on the basis of, for example, final endings, connective endings, punctuation marks, parts of speech, grammar, etc. of sentences.

In addition, the sentence separator 120 may divide the speech into respective sentence units by using a natural language processing algorithm which is widely known in the corresponding technical field.

Figure 4:
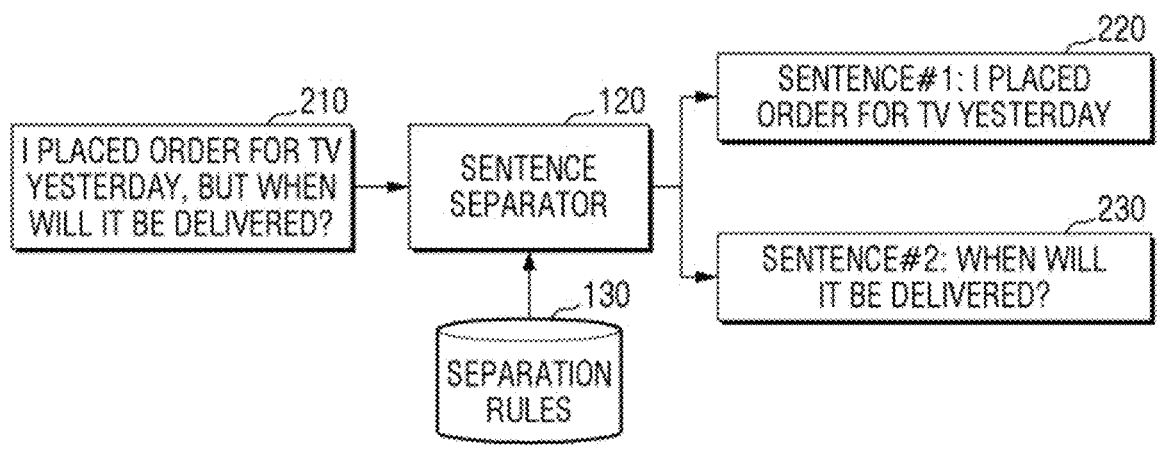
FIG. 4 is an exemplary diagram illustrating a sentence separator which is a component of the dialogue processing device.

FIG. 4 shows an example in which the sentence separator 120 divides a speech into a first sentence and a second sentence according to the separation rules 130. As shown in FIG. 4, when the speech "I placed an order for a television (TV) yesterday, but when will it be delivered?" 210 is given, the sentence separator 120 may divide the speech 210 into a first sentence "I placed an order for a TV yesterday" 220 and a second sentence "when will it be delivered?" 230 according to the separation rules 130.

Next, the dialog act analyzer 140 analyzes and extracts a dialog act which indicates the intention implied in the user's speech from each sentence. By way of example, the types of dialog acts are shown in FIGS. 5 and 6.

Referring to FIG. 5, a dialog act which may be implied in each sentence may be, for example, a notification dialog act for providing information, a request dialog act for requesting processing of a specific act, a question dialog act for requesting information on a specific query, a response dialog act for notifying an intention of confirming information, and the like. However, these are only examples for aiding in understanding of the present disclosure, and the types of dialog acts may vary without limit according to exemplary embodiment.

Referring to FIG. 6, the question dialog act may be defined as subdivided dialog acts. For example, the question dialog act may be subdivided into a first question dialog act (e.g., a WH-question dialog act) for requesting comprehensive information on a specific query, a second question dialog act (e.g., a Y/N-question dialog act) for requesting only positive (yes) or negative (no) information, a third question dialog act for requesting confirmation of a previous question, and the like. A method in which the dialog act analyzer 140 extracts a dialog act implied in each sentence will be described below.

In an exemplary embodiment, the dialog act analyzer 140 may extract a dialog act implied in each sentence according to preset rules. Here, the preset rules may be defined on the basis of sentence features, such as final endings, connective endings, parts of speech included in sentences, punctuation marks, and the like. As an example, a first rule may be defined so that when the question mark "?" is at the end of a sentence, a dialog act implied in the sentence is a question dialog act. As another example, a second rule may be defined so that, when a sentence has a declarative final ending, a dialog act implied in the sentence is a notification dialog act, and a third rule may be defined so that, when a sentence has an interrogative final ending, a dialog act implied in the sentence is a question dialog act.

In an exemplary embodiment, the dialog act analyzer 140 may extract a dialog act implied in each sentence on the basis of a machine learning-based dialog act model 150. Here, characteristics used for learning the dialog act model 150 may include, for example, the aforementioned sentence features, and when the dialog act model 150 is built on the basis of a deep neural network, characteristics may be automatically extracted from preprocessed sentences.

Figure 14:
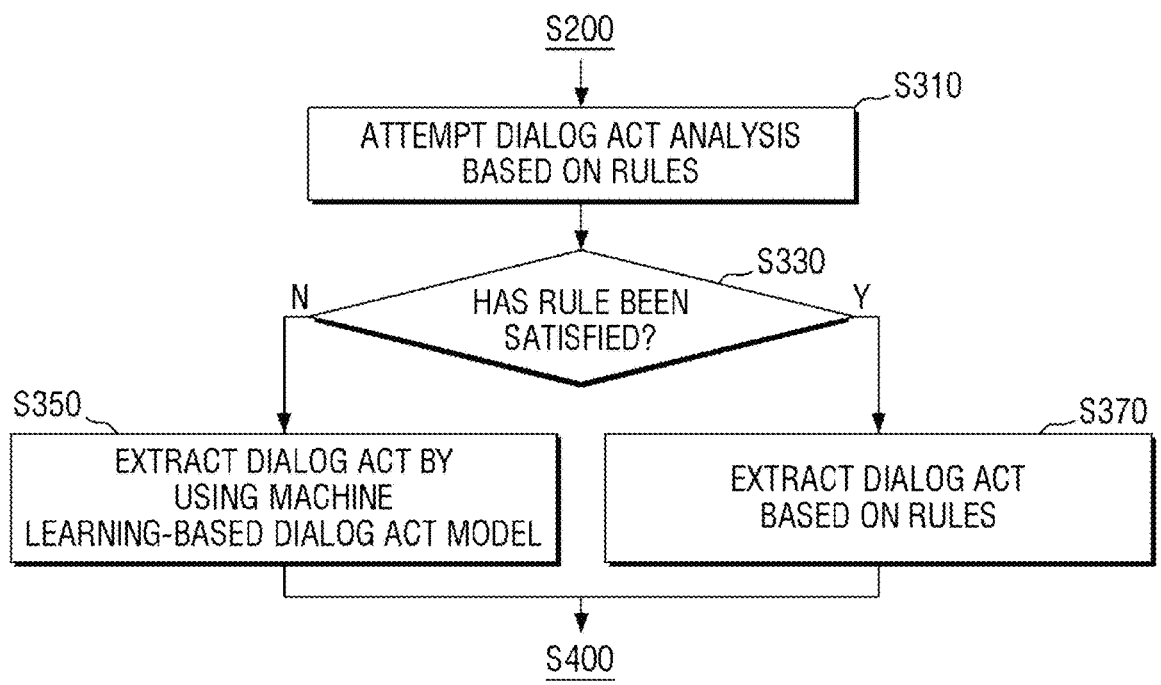
FIG. 14 is a detailed flowchart of a dialog act extraction method which may be referred to in some embodiments of the present disclosure.

In an exemplary embodiment, the dialog act analyzer 140 may attempt to extract a dialog act of a corresponding sentence according to the preset rules and may extract a dialog act of the corresponding sentence by using the dialog act model 150 when no rule is satisfied. The present embodiment will be further described below with reference to FIG. 14.

In some exemplary embodiments, characteristics used for learning the dialog act model 150 may further include a dialog act of a previous sentence and/or a dialog act of a next sentence. Since it is highly likely that a notification dialog act may be present before or after a request dialog act or a question dialog act, it is possible to improve accuracy in extracting dialog acts by learning such a pattern. For reference, when the dialog act model 150 is built on the basis of a deep neural network, a previous sentence and a next sentence are also input to the deep neural network, and dialog acts of the previous sentence and the next sentence may also be automatically taken into consideration.

Figure 7A:
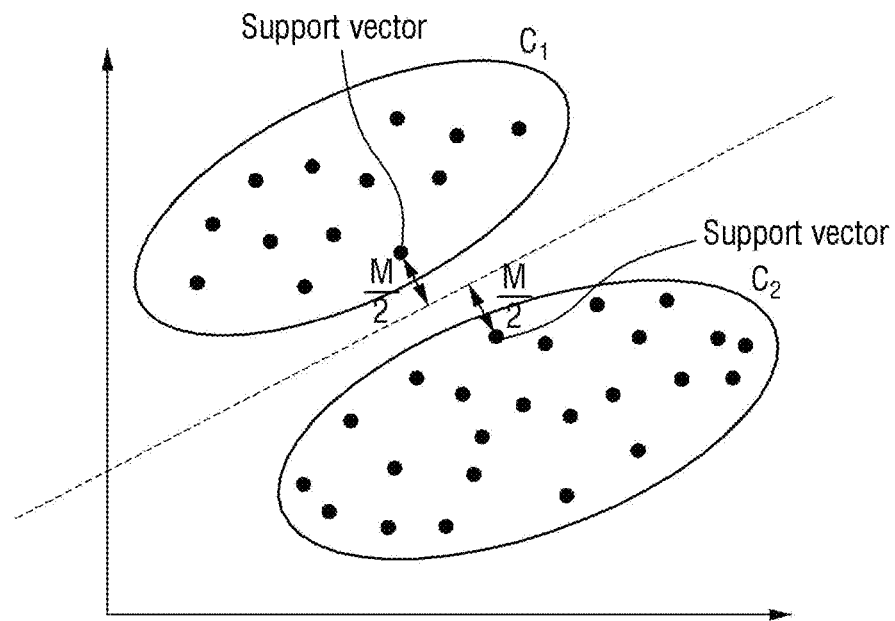
FIGS. 7A to 7C are exemplary diagrams of machine learning models for building a dialog act model.
Figure 7B:
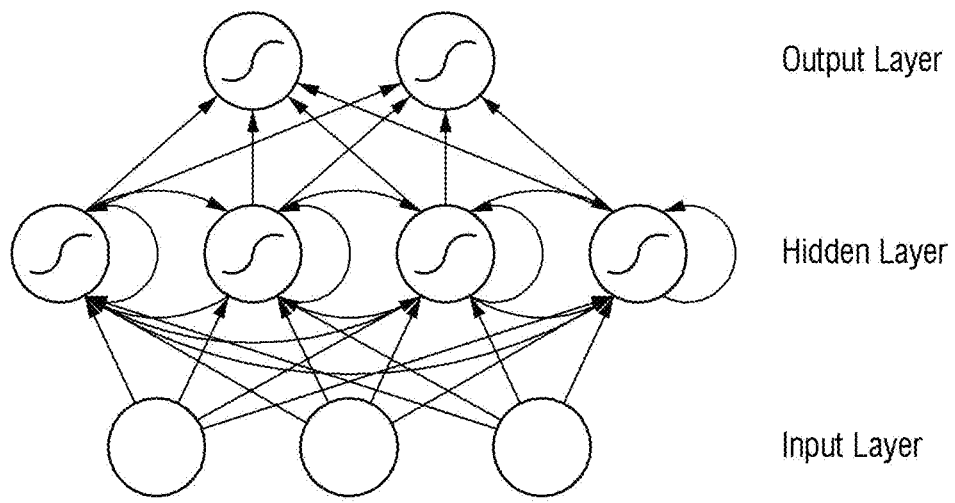
Figure 7C:
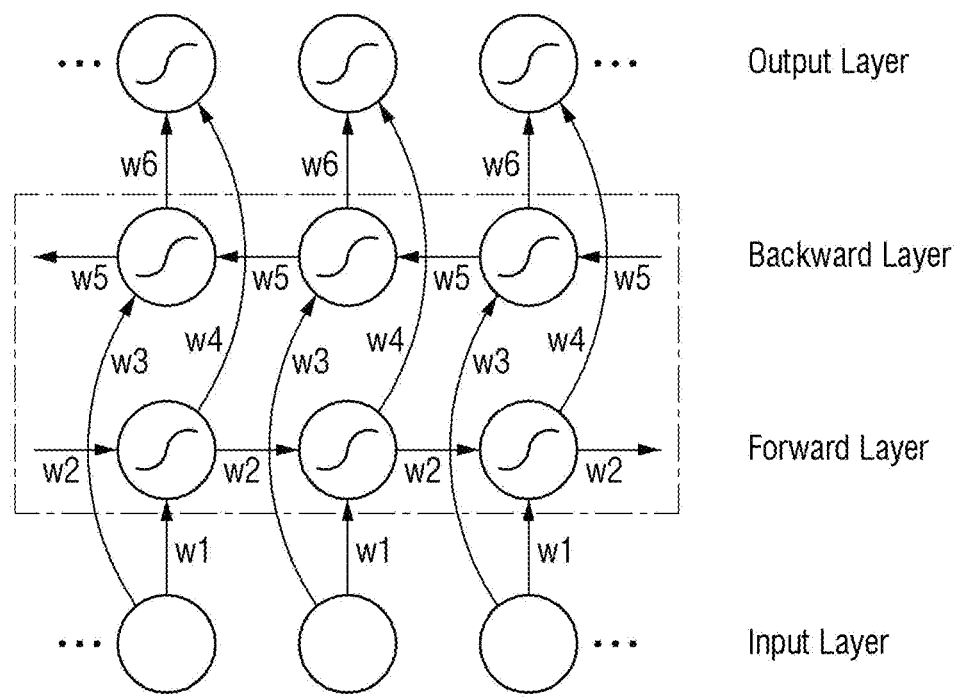

In some exemplary embodiments, the dialog act model 150 may be based on machine learning models, such as a support vector machine (SVM), a recurrent neural network (RNN), a bidirectional RNN (BRNN), and the like. Configurations of the aforementioned machine learning models are shown in FIGS. 7A to 7C. For example, when dialog acts are classified according to sentence features, the dialog act model 150 may be built on the basis of the SVM model. In another example, when dialog acts are classified by further considering dialog acts of the previous sentence, the dialog act model 150 may be built on the basis of the RNN model for efficient learning. In still another example, when dialog acts are classified by further considering dialog acts of the previous sentence and the next sentence, the dialog act model 150 may be built on the basis of the BRNN model. However, the dialog act model 150 is not limited to the aforementioned machine learning models, and may also be built on the basis of any kind of neural network model.

In some exemplary embodiments, when vocal data of speech sentences is input to the speech data input unit 110, the dialog act analyzer 140 may extract a dialog act of each sentence by further considering an intonation of vocal data corresponding to the sentence. This will be described below with reference to FIG. 17.

Figures 8, 9:
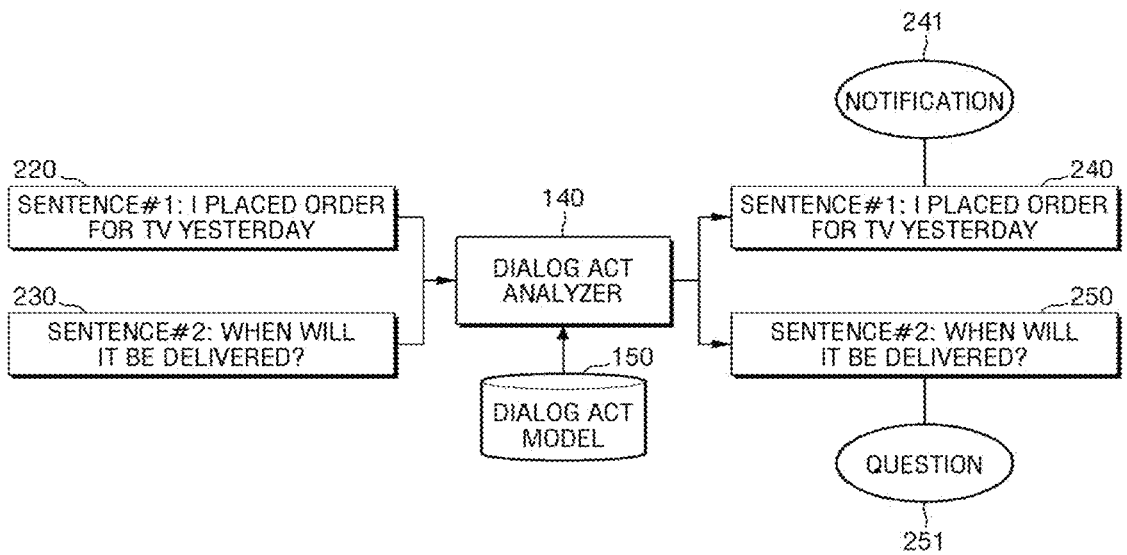
FIG. 8 is an exemplary diagram illustrating a dialog act analyzer which is a component of the dialogue processing device.
FIG. 9 shows exemplary rules for determining priority orders which may be referred to in some embodiments of the present disclosure.

FIG. 8 shows an example in which the dialog act analyzer 140 extracts dialog acts of the first sentence 220 and the second sentence 230 by using the dialog act model 150 according to the above-described exemplary embodiment. Referring to FIG. 8, it is possible to see that, as a dialog act analysis result, a dialog act implied in a first sentence 240 is classified as a notification dialog act 241 and a dialog act implied in a second sentence 250 is classified as a question dialog act 251.

Next, the priority order determiner 160 determines a priority order for processing each sentence on the basis of a dialog act extracted by the dialog act analyzer 140.

In an exemplary embodiment, the priority order determiner 160 may determine a priority order for each sentence according to preset rules. The preset rules may be defined as shown in FIG. 9 by way of example, but may be defined variously according to exemplary embodiment. In another exemplary embodiment, however, the priority order determiner 160 may determine a priority order for each sentence by using a machine learning-based priority order determination model.

Referring to FIG. 9, when a dialog act of a first sentence is a notification dialog act and a dialog act of a second sentence is any one of a question dialog act and a request dialog act, the priority order determiner 160 may give a higher priority order to the second sentence regardless of a sequence of the two sentences. Since a question dialog act or a request dialog act reflects a more proactive intention of a user, it is highly likely that processing of the question dialog act or request dialog act with higher priority accords with the intention in the user's speech.

Also, when both dialog acts of first and second sentences are notification dialog acts, no priority order may be given to the two sentences. This is because it is difficult to detect the accurate intention in the user's speech. In this case, the dialogue processor 170 may generate and provide a response sentence including a query for specifying the intention in the user's speech.

In some exemplary embodiments, when a dialog act implied in a first sentence is a first question dialog act (e.g., a Y/N-question dialog act) for requesting a positive (yes) or negative (no) response and a dialog act implied in a second sentence is not the first question dialog act but is a second question dialog act (e.g., a WH-question dialog act), a higher priority order may be given to the first sentence. This is because it is highly like that rapidly processing a query to which a reply can be immediately made accords with the intention in the user's speech.

Figures 10, 11:
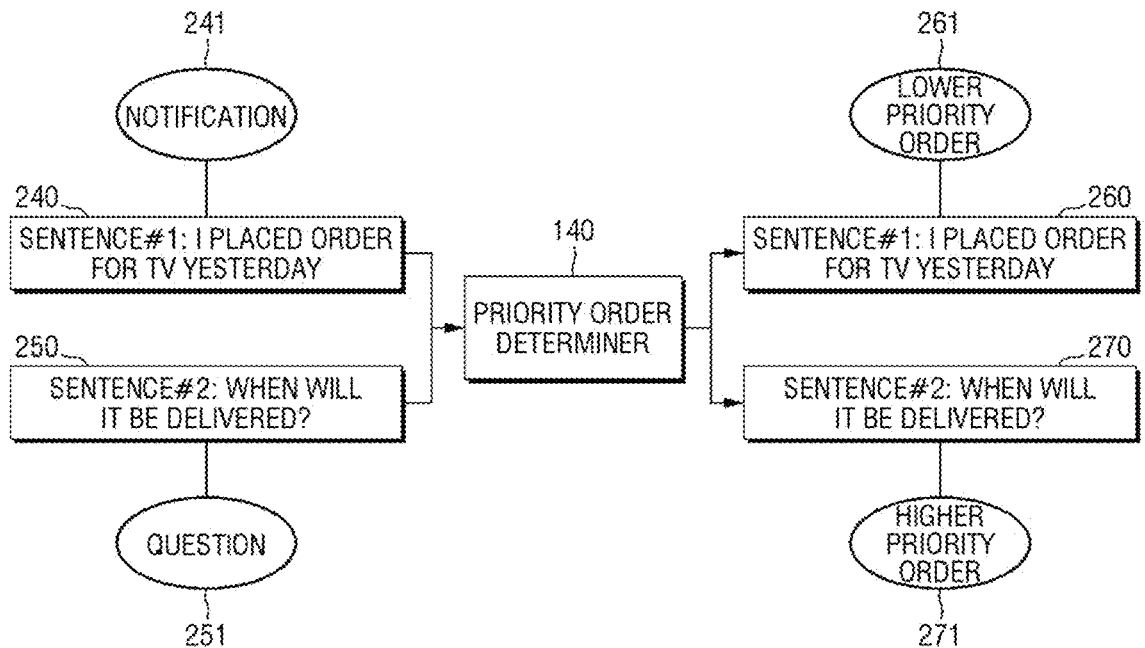
FIG. 10 is an exemplary diagram illustrating a priority order determiner which is a component of the dialogue processing device.
FIG. 11 shows an example of a slot filling-based dialogue frame which may be referred to in some embodiments of the present disclosure.

In some exemplary embodiments, a priority order may be determined on the basis of the number of empty slots of a predefined slot filling-based dialogue frame. Here, the dialogue frame denotes a frame defined on the basis of various situations, such as various topics, to process speech sentences of users. For example, as shown in FIG. 11, information, such as product information, ordering time information, etc., may be essentially required to process a query or request related to delivery, and the essentially required information may be defined as each piece of slot information of the dialogue frame. Since the concept of slot filling is self-evident to those of ordinary skill in the art, description thereof will be omitted.

In the above-described exemplary embodiment, when the dialog acts implied in the first and second sentences are question dialog acts or request dialog acts, a priority order may be determined on the basis of the number of empty slots of a first dialogue frame used for processing the first sentence and a second dialogue frame used for processing the second sentence. For example, a higher priority order may be given to a sentence having a smaller number of empty slots. For reference, slots of the first dialogue frame and the second dialogue frame may be filled on the basis of speech sentences which have been obtained up to now. According to the present embodiment, it is possible to first process a sentence which can be processed more rapidly, and thus a speech sentence may be efficiently processed.

FIG. 10 shows an example in which priority orders are determined according to the rules shown in FIG. 9. Referring to FIG. 10, it is possible to see that, when a dialog act implied in the first sentence 240 is the notification dialog act 241 and a dialog act implied in the second sentence 250 is the question dialog act 251, the priority order determiner 160 gives a higher priority order 271 to a second sentence 270 according to the preset rules.

Next, the dialogue processor 170 processes each sentence according to priority orders determined by the priority order determiner 160.

In some exemplary embodiments, when determined priority orders are identical to each other, the dialogue processor 170 may evaluate importance of each sentence and process the sentence on the basis of the importance. This will be described in detail below with reference to FIGS. 16 to 17B. However, according to an exemplary embodiment, the priority order determiner 160 may give a priority order to each sentence on the basis of importance of the sentence.

In some exemplary embodiments, the dialogue processor 170 may process each sentence by using the slot filling-based dialogue frame shown in FIG. 11. Also, the dialogue processor 170 may process each sentence in consideration of a dialog act, a topic, etc. implied in the sentence.

For example, when a dialog act implied in a sentence to be processed is a query or request dialog act, the dialogue processor 170 may determine a dialogue frame based on a topic of the sentence to be processed, and fill slots of the dialogue frame with information included in speech sentences which have been obtained up to now. Then, when the slots are filled up, the dialogue processor 170 may generate and provide a response sentence on the basis of the dialogue frame. When some slots are empty, the dialogue processor 170 may generate and provide a response sentence for querying information indicated by the empty slots.

In some exemplary embodiments, when both the first and second sentences included in the speech indicate notification dialog acts, the dialogue processor 170 may generate and provide a response sentence for querying the intention in the user's speech to detect the accurate intention in the user's speech.

Each component of FIG. 3 described above may denote software or hardware, such as a field programmable gate array (FPGA) or an application-specific integrated circuit (ASIC). However, the components are not limited to software or hardware and may be configured to reside in an addressable storage medium or to execute one or more processors. Functionality provided by the components may be implemented by subdivided components, and a plurality of components may be merged into one component which performs a specific function.

A configuration and operation of the dialogue processing device 100 according to an exemplary embodiment of the present disclosure have been described above with reference to FIGS. 3 to 11. Next, a hardware configuration of the dialogue processing device 100 according to another exemplary embodiment of the present disclosure will be described with reference to FIG. 12.

Figure 12:
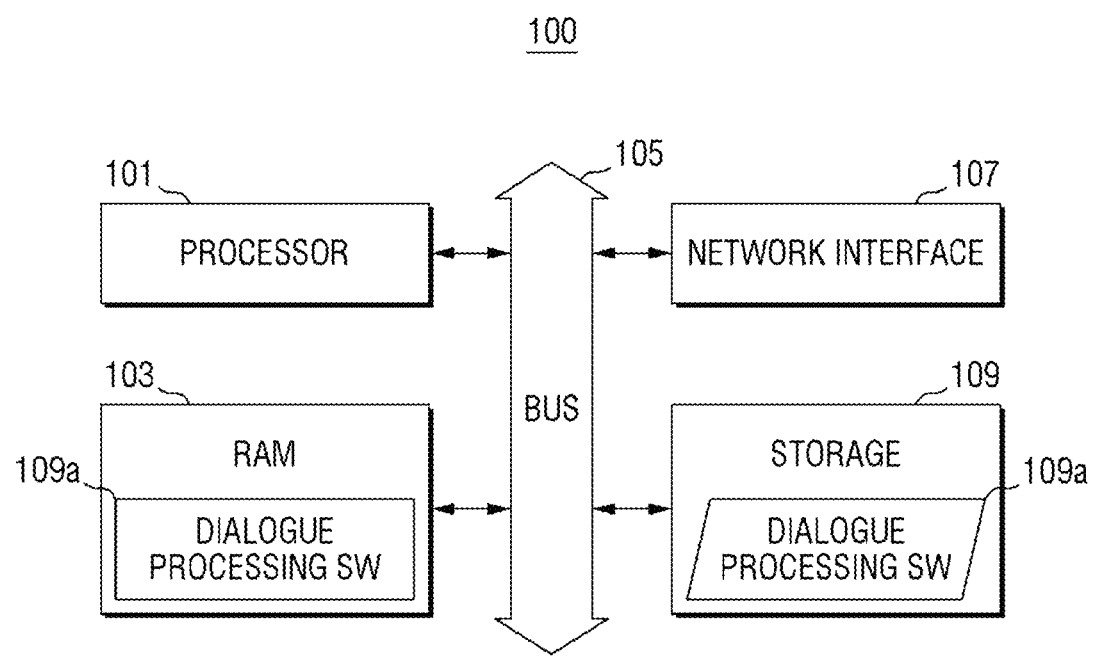
FIG. 12 is a diagram showing a hardware configuration of a dialogue processing device according to another exemplary embodiment of the present disclosure.

Referring to FIG. 12, the dialogue processing device 100 may include at least one processor 101, a bus 105, a network interface 107, a memory 103 into which a computer program executed by the processor 101 is loaded, and a storage 109 for storing dialogue processing software 109a. However, only components related to exemplary embodiments of the present disclosure are shown in FIG. 12. Therefore, those of ordinary skill in the art to which the present disclosure pertains would appreciate that general-purpose components other than those shown in FIG. 12 may also be included.

The processor 101 controls overall operation of each component of the dialogue processing device 100. The processor 101 may be configured to include a central processing unit (CPU), a microprocessor unit (MPU), a micro controller unit (MCU), a graphics processing unit (GPU), or any form of processor widely known in the technical field of the present disclosure. Also, the processor 101 may perform computing tasks of at least one application or program for executing methods according to exemplary embodiments of the present disclosure. The dialogue processing device 100 may have one or more processors.

The memory 103 stores various kinds of data, commands, and/or information. One or more programs may be loaded from the storage 109 into the memory 103 so that methods of processing dialogue according to exemplary embodiments of the present disclosure are performed. In FIG. 12, a random access memory (RAM) is shown as an example of the memory 103.

The bus 105 provides a communication function between components of the dialogue processing device 100. The bus 105 may be implemented in various forms, such as an address bus, a data bus, a control bus, and the like.

The network interface 107 supports wired/wireless Internet communication of the dialogue processing device 100. Also, the network interface 107 may support various communication methods in addition to Internet communication. To this end, the network interface 107 may be configured to include a communication module widely known in the technical field of the present disclosure.

The storage 109 may non-temporarily store the one or more programs. In FIG. 12, the dialogue processing software 109a is shown as an example of the one or more programs.

The storage 109 may be configured to include a non-volatile memory, such as a read-only memory (ROM), an erasable programmable ROM (EPROM), an electrically erasable programmable ROM (EEPROM), a flash memory, etc., a hard disk, a detachable disk, or any form of computer-readable recording medium widely known in the technical field of the present disclosure.

According to an exemplary embodiment of the present disclosure, the dialogue processing software 109a may determine a priority order for processing each sentence on the basis of dialog act information of the sentence and process the sentence according to the determined priority order.

Specifically, the dialogue processing software 109a may perform an operation of being loaded into the memory 103 and receiving a speech including a plurality of sentences by the at least one processor 101, an operation of dividing the speech into a first sentence and a second sentence, an operation of extracting a first dialog act implied in the first sentence and a second dialog act implied in the second sentence through dialog act analysis, an operation of determining respective priority orders for the first and second sentences on the basis of the first and second dialog acts, and an operation of processing the first and second sentences according to the determined priority orders.

The dialogue processing device 100 according to the exemplary embodiments of the present disclosure has been described above with reference to FIGS. 3 to 12. Next, a method of processing dialogue according to another exemplary embodiment of the present disclosure will be described in detail with reference to FIGS. 13 to 17. Descriptions which have already been made with reference to FIGS. 3 to 12 will be omitted.

Each operation of a method of processing dialogue described below according to an exemplary embodiment of the present disclosure may be performed by a computing device. For example, the computing device may be the dialogue processing device 100. However, a subject which performs each operation included in the method of processing dialogue may be omitted for convenience of description. Also, each operation of the method of processing dialogue may be performed by the dialogue processing device 100 when the dialogue processing software 109a is executed by the processor 101.

Figure 13:
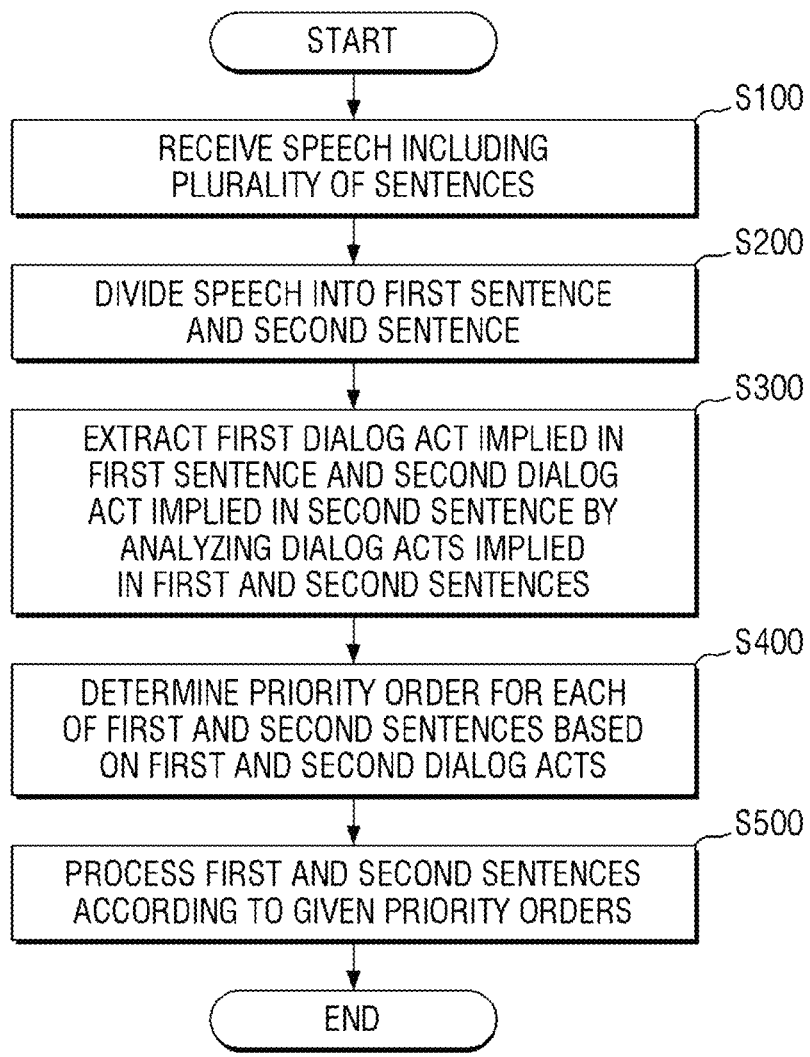
FIG. 13 is a flowchart of a method of processing dialogue according to another exemplary embodiment of the present disclosure.

FIG. 13 is a flowchart of a method of processing dialogue according to an exemplary embodiment of the present disclosure. However, this is only an exemplary embodiment for achieving an object of the present disclosure, and some operations may be added or omitted as necessary. For convenience of description, the flowchart of FIG. 13 is based on an assumption that two sentences are included in a speech. However, it is self-evident that it is possible to use the method without changing the technical spirit of the present disclosure even when three or more sentences are included.

Referring to FIG. 13, the dialogue processing device 100 receives a speech including a plurality of sentences (S100), and divides the speech into a first sentence and a second sentence according to preset sentence separation rules (S200). In connection with some exemplary embodiments related to operations S100 and S200, it is recommended to refer to the descriptions of the speech data input unit 110 and the sentence separator 120.

Next, the dialogue processing device 100 extracts a first dialog act implied in the first sentence and a second dialog act implied in the second sentence by analyzing a dialog act implied in each of the first and second sentences (S300). In some exemplary embodiments related to operation S300, it is recommended to refer to the descriptions of the dialog act analyzer 140.

In some exemplary embodiments, the dialogue processing device 100 may extract dialog acts by using rule-based dialog act classification and machine learning-based dialog act classification together. Specifically, the dialogue processing device 100 may first attempt dialog act analysis on the basis of rules (S310) and may extract dialog acts second by using a machine learning-based dialog act model (S330 and S350) when no rule is satisfied. When a rule is satisfied, the dialog act model may not be used (S330 and S370). In the present embodiment, dialog act analysis is first performed on the basis of rules because it is possible to obtain more accurate results from dialog act extraction based on predefined rules. However, it is not possible to define all rules, and thus the machine learning-based dialog act model may be used.

In some exemplary embodiments, the dialogue processing device 100 may further receive vocal data of speech sentences and extract dialog acts more accurately by using the vocal data. This will be described with reference to the flowchart shown in FIG. 15.

Figure 15:
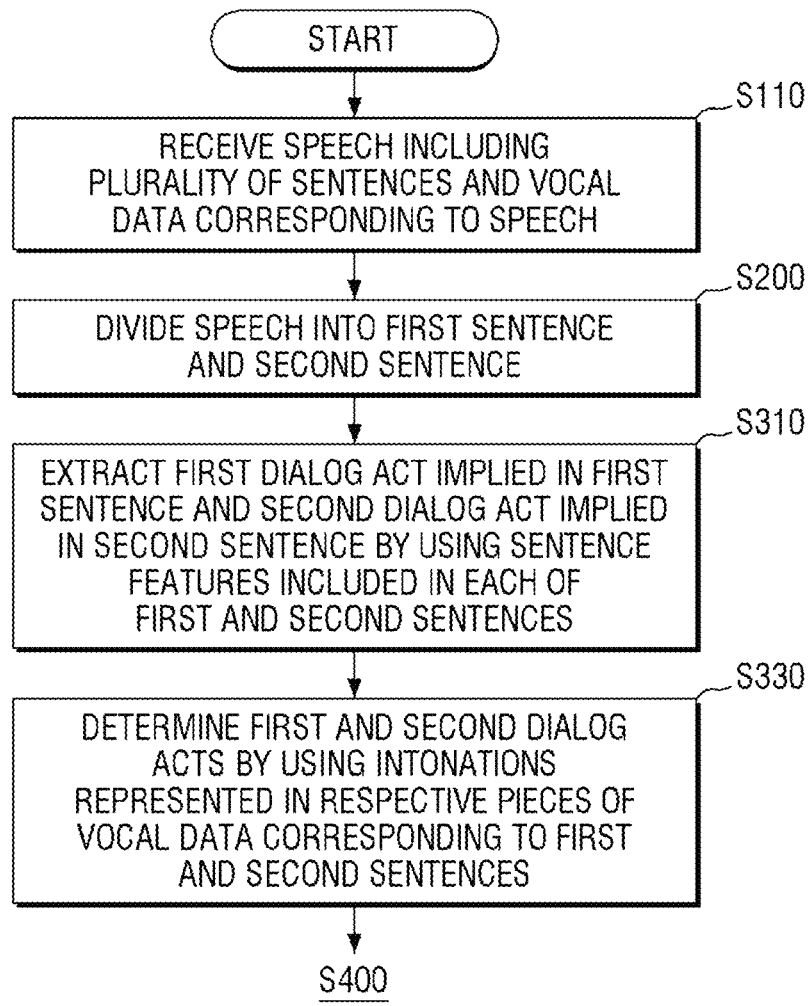
FIG. 15 is a detailed flowchart of a vocal data-based dialog act extraction method which may be referred to in some embodiments of the present disclosure.

Referring to FIG. 15, when a speech including a plurality of sentences and vocal data corresponding to the speech sentences are input (S110), the dialogue processing device 100 may determine a first dialog act and a second dialog act by using intonations represented in respective pieces of vocal data corresponding to a first sentence and a second sentence (S330). For example, when there is a rising intonation at the end of the first sentence, a dialog act implied in the sentence may be determined to be a question dialog act. Like this, when an intonation represented in vocal data is further taken into consideration, it is possible to extract a dialog act implied in each sentence more accurately.

Next, the dialogue processing device 100 determines respective priority orders for the first and second sentences on the basis of the first dialog act and the second dialog act (S400). In connection with some exemplary embodiments related to operation S400, it is recommended to refer to the description of the priority order determiner 160.

Next, the dialogue processing device 100 processes the first and second sentences according to the given priority orders (S500). In some exemplary embodiments related to operation S500, it is recommended to refer to the description of the dialogue processor 170.

In an exemplary embodiment, when the priority orders for the first and second sentences are identical to each other, the dialogue processing device 100 may sequentially process the first and second sentences according to a sequence of the first and second sentences.

Figures 16, 17A:
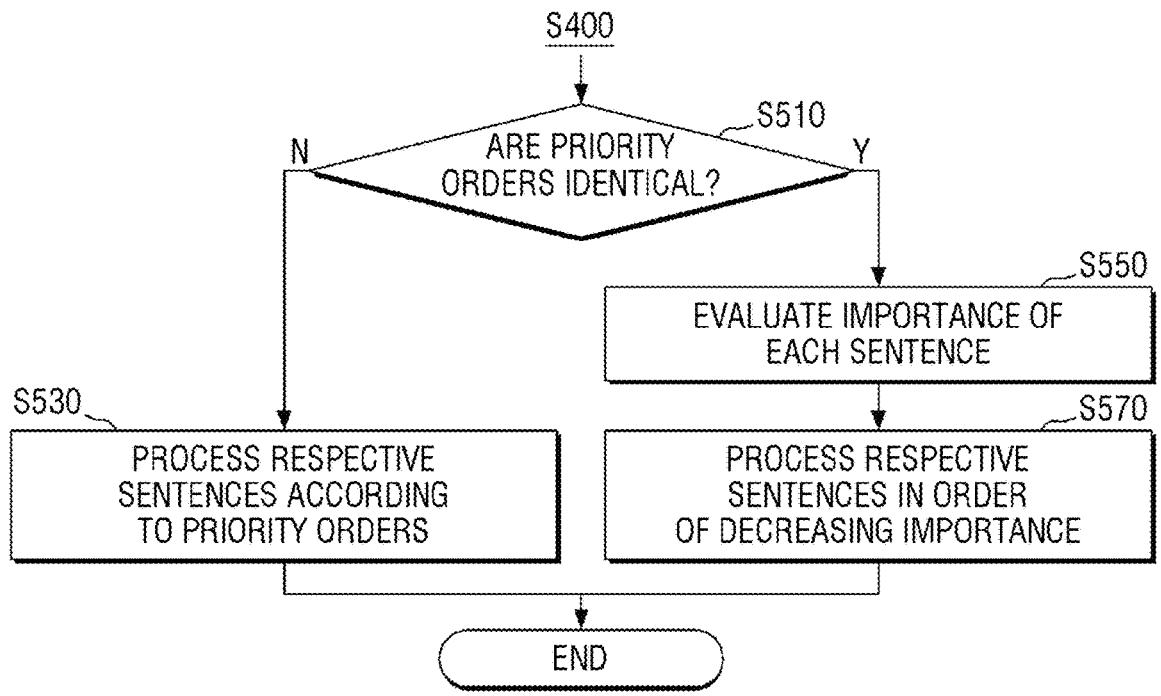

In an exemplary embodiment, when the priority orders for the first and second sentences are identical to each other, the dialogue processing device 100 may process the first and second sentences as shown in FIG. 16. This exemplary embodiment will be described below with reference to FIG. 16.

Referring to FIG. 16, the dialogue processing device 100 may determine whether the priority orders for the first and second sentences are identical (S510) and process the respective sentences according to the priority orders when it is determined that the priority orders differ from each other (S530). On the other hand, when the priority orders are identical, the dialogue processing device 100 may evaluate importance of each sentence (S550) and process the sentences in order of high importance (S570).

In some exemplary embodiments, importance of the sentences may be evaluated through sentiment analysis. For example, the sentiment analysis may be performed by counting the number of emotional words included in each sentence. Examples of emotional words are shown in FIG. 17A.

In some exemplary embodiments, the degree of emotion implied in an emotional word may be further taken into consideration to perform the sentiment analysis. For example, sentiment analysis of each sentence may be performed by using information obtained by scoring the degrees of emotion implied in emotional words as shown in FIG. 17B. More specifically, a sentiment score of each sentence may be calculated by using the information such as that shown in FIG. 17B, and the sentiment score may be calculated through accumulated word-specific sentiment scores. According to an exemplary embodiment, a sentiment score may be obtained as a weighted sum by giving a high weight to a negative emotional word. This is because it is necessary to rapidly process a sentence including a negative word.

In some exemplary embodiments, when vocal data indicating speech sentences is further input, sentiment analysis may be performed by further using vocal data corresponding to each sentence. For example, a user's tone, intonation, etc. included in the vocal data may be used to perform sentiment analysis. The sentiment analysis may be performed in any way, and a machine learning-based sentiment analysis model may be used by way of example.

In some exemplary embodiments, importance of each sentence may be evaluated on the basis of characteristics included in the sentence. For example, importance of each sentence may be evaluated on the basis of a first characteristic which indicates the number of nouns included in the sentence and a second characteristic which indicates the number of words recognized through named entity recognition in the sentence. According to exemplary embodiment, appropriate weights may be given to the first characteristic and the second characteristic, and importance of each sentence may be calculated as a weighted sum of the characteristic-specific scores. In the present embodiment, the named entity recognition may be performed by using at least one named entity recognition algorithm widely known in the corresponding technical field.

In some exemplary embodiments, a machine learning-based first Bayes model may be used to evaluate importance of each sentence. Here, the first Bayes model may be, for example, a naïve Bayes model, but is not limited thereto. Also, the first Bayes model may be a model learned on the basis of dialogue histories of users who have spoken speech sentences.

Specifically, the first Bayes model may be built by learning a user's dialog history in which speech sentences are tagged with certain degrees of importance, and characteristics used for the learning may be, for example, words included in each speech sentence, nouns, words recognized through named entity recognition, and the like. Also, the learning may be performed by using, for example, maximum likelihood estimation (MLE), but maximum a posteriori (MAP) may be used when there is a prior probability. When the first Bayes model is built, a Bayes probability of each sentence may be calculated by using a characteristic included in the sentence, and importance of the sentence may be evaluated by using the Bayes probability. For example, assuming that importance of a first sentence and a second sentence is evaluated, the first Bayes model may be used to calculate a 1-1 Bayes probability indicating estimated importance of the first sentence and a 1-2 Bayes probability indicating estimated importance of the second sentence. Then, importance of each of the first and second sentences may be evaluated by using a ratio (e.g., a likelihood ratio) between the 1-1 Bayes probability and the 1-2 Bayes probability.

In some exemplary embodiments, a machine learning-based second Bayes model may be used to evaluate importance of each sentence. Here, the second Bayes model may be a model learned on the basis of dialogue histories of a plurality of users (e.g., all users who use an intelligent ARS). Also, the second Bayes model may be, for example, a naïve Bayes model, but is not limited thereto. Since a method of evaluating importance of each sentence by using the second Bayes model is similar to the method employing the first Bayes model, description thereof will be omitted.

In some exemplary embodiments, both the first Bayes model and the second Bayes model may be used to evaluate importance of each sentence. For example, assuming that importance of a first sentence and a second sentence is evaluated, the first Bayes model may be used to calculate a 1-1 Bayes probability indicating estimated importance of the first sentence and a 1-2 Bayes probability indicating estimated importance of the second sentence. Also, the second Bayes model may be used to calculate a 2-1 Bayes probability of the first sentence and a 2-2 Bayes probability of the second sentence. Then, 1-1 importance of the first sentence and 1-2 importance of the second sentence may be determined by using a ratio (e.g., a likelihood ratio) between the 1-1 Bayes probability and the 1-2 Bayes probability. Likewise, 2-1 importance of the first sentence and 2-2 importance of the second sentence may be determined by using a ratio (e.g., a likelihood ratio) between the 2-1 Bayes probability and the 2-2 Bayes probability. Finally, a final importance of the first sentence may be determined as a weighted sum or the like of the 1-1 importance and the 2-1 importance, and a final importance of the second sentence may be determined as a weighted sum or the like of the 1-2 importance and the 2-2 importance. A method of processing dialogue according to an exemplary embodiment of the present disclosure has been described with reference to FIGS. 13 to 17. According to the above-described method, when a speech including a plurality of sentences is processed, a processing sequence of the sentences is determined on the basis of dialog acts implied in the sentences rather than a sequence of the sentences. In other words, a dialogue is processed in consideration of an intention in a user's speech, and thus a response desired by the user is rapidly provided.

According to the above-described present disclosure, when a speech including a plurality of sentences is processed, a processing sequence of the sentences is determined on the basis of dialog acts implied in the sentences rather than a sequence of the sentences. In other words, a dialogue is processed in consideration of an intention in a user's speech, and thus a response desired by the user is rapidly provided.

When the above-described present disclosure is applied to an intelligent automatic response service (ARS) system, it is possible to accurately detect the content of a user's query and rapidly provide a response. Therefore, the user's satisfaction is improved.

Among a plurality of sentences included in a speech, a sentence corresponding to a request dialog act or a question dialog act is given a high priority order and processed first. Therefore, a dialogue can be processed in consideration of an intention in a user's speech.

To consider an intention in a user's speech, a rule-based dialog act model and a machine learning-based dialog act model may be used together. Accordingly, accuracy in extracting a dialog act is improved, and an intention in a user's speech can be accurately taken into consideration.

To learn the dialog act models, not only sentence features including the final ending of a sentence but also dialog acts and the like of the previous sentence and the next sentence may be used as characteristic elements. Also, intonations represented in a user's vocal data may be additionally used to perform dialog act analysis. Accordingly, accuracy in extracting a dialog act can be further improved.

Effects of the present disclosure are not limited to those mentioned above, and other effects which have not been mentioned can be clearly understood by those of ordinary skill in the art from the above description.

The concepts of the invention described above with reference to FIGS. 5 to 18 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method, performed by a dialogue processing device, of processing dialogue associated with a user based on dialog act information, the method comprising:

receiving speech information, corresponding to speech of the user, including a plurality of sentence units;

identifying a first sentence unit and a second sentence unit, of the plurality of sentence units, based on receiving the speech information;

extracting a first dialog act indicative of an intention of the first sentence unit and extracting a second dialog act indicative of an intention of the second sentence unit;

determining respective priority orders for the first and second sentence units based on the first and second dialog acts; and processing the first sentence unit and the second sentence unit in a sequence according to the respective priority orders, wherein when the first and second dialog acts are either both question dialog acts indicative of the user providing a query or both request dialog acts indicative of the user providing a request, the determining of the respective priority orders comprises:

determining a first dialogue frame used to process the first sentence unit and a second dialogue frame used to process the second sentence unit, the first and second dialogue frames being slot filling-based dialogue frames;

filling respective slots of the first and second dialogue frames with information included in the speech information;

assigning a first priority order for the first sentence unit and a second priority order for the second sentence unit, the first priority order being higher than the second priority order when a first number of empty slots of the first dialogue frame is smaller than a second number of empty slots of the second dialogue frame, and wherein the processing the first sentence unit and the second sentence unit in a sequence according to the respective priority orders comprises, processing the first sentence unit having the first priority order by providing a first response sentence to the user for querying information corresponding to the empty slots of the first dialogue frame;

obtaining information from the user for filling the empty slots of the first dialogue frame, and processing the second sentence unit having the second priority order after processing the first sentence unit.

2. The method of claim 1, wherein when the respective priority orders are identical, the processing of the first and second sentence units comprises:

evaluating respective importance of each of the first and second sentence units; and processing the first or second sentence unit having a greater importance first in the sequence.

3. The method of claim 2, wherein the evaluating of the respective importance of each of the first and second sentence units comprises:

performing sentiment analysis on each of the first and second sentence units; and evaluating the respective importance of the first and second sentence units based on results of the sentiment analysis.

4. The method of claim 3, further comprising receiving vocal data corresponding to the speech information, and wherein the performing of the sentiment analysis comprises performing the sentiment analysis by further using the vocal data corresponding to the first and second sentence units.

5. The method of claim 2, wherein the evaluating of the respective importance of each of the first and second sentence units comprises:

calculating a 1-1 Bayes probability indicating estimated importance of the first sentence unit and calculating a 1-2 Bayes probability indicating estimated importance of the second sentence unit by using a machine learning-based first Bayes model; and evaluating respective importance of each of the first and second sentence units based on the 1-1 Bayes probability and the 1-2 Bayes probability, and wherein the first Bayes model is trained using a dialogue history of the user.

6. The method of claim 5, wherein the evaluating of the respective importance of each of the first and second sentence units based on the 1-1 Bayes probability and the 1-2 Bayes probability comprises:

calculating a 2-1 Bayes probability of the first sentence unit and calculating a 2-2 Bayes probability of the second sentence unit by further using a machine learning-based second Bayes model; and evaluating respective importance of each of the first and second sentence units by further using the 2-1 Bayes probability and the 2-2 Bayes probability, and wherein the second Bayes model is trained using dialogue histories of a plurality of users.

7. The method of claim 2, wherein the evaluating of the respective importance of each of the first and second sentence units comprises evaluating respective importance of the first and second sentence units based on characteristics included in the first and second sentence units, and wherein the characteristics include a number of nouns included in the respective first and second sentence units, and a number of words recognized through named entity recognition in the respective first and second sentence units.

8. The method of claim 1, wherein the extracting of the first dialog act and the second dialog act comprises extracting the first and second dialog acts by using respective sentence features, of the first and second sentence units, including respective ending punctuation marks of the first and second sentence units.

9. The method of claim 8, wherein the extracting of the first and second dialog acts comprises extracting the first and second dialog acts by further using respective dialog acts of respective previous sentence units for each of the first and second sentence units and respective dialog acts of respective subsequent sentence units for each of the first and second sentence units.

10. The method of claim 8, further comprising:

receiving vocal data corresponding to the speech information, and wherein the extracting of the first and second dialog acts comprises extracting the first and second dialog acts by further using respective intonations, represented in the vocal data, corresponding to each of the first and second sentence units.

11. The method of claim 1, wherein the extracting of the first dialog act and the second dialog act comprises:

determining that a set of preset rules is not satisfied; and extracting the first and second dialog acts by using a machine learning-based dialog act model based on determining that the set of preset rules is not satisfied.

12. The method of claim 11, wherein characteristics input to the machine learning-based dialog act model include information associated with respective ending punctuation marks of the first and second sentence units, respective dialog acts of respective previous sentence units of each of the first and second sentence units, and respective dialog acts of respective subsequent sentence units of the first and second sentence units.

13. The method of claim 1, wherein when the first dialog act is a notification dialog act indicative of the user providing information, and the second dialog act is a question dialog act indicative of the user providing a query or a request dialog act indicative of the user providing a request, the determining of the respective priority orders comprises determining a priority order for the second sentence unit to be greater than a priority order for the first sentence unit.

14. The method of claim 13, wherein the processing of the first and second sentence units comprises:

determining a slot filling-based dialogue frame used to process the second sentence unit;

filling slots of the slot filling-based dialogue frame with information included in the speech information; and generating a response, to be provided to the user, for querying information corresponding to an empty slot in the slot filling-based dialogue frame.

15. The method of claim 1, wherein when the first and second dialog acts are either both question dialog acts indicative of the user providing a query or both request dialog acts indicative of the user providing a request, the determining of the respective priority orders comprises determining the respective priority orders for the first and second sentence units to be identical.

16. The method of claim 1, wherein when the first dialog act is a first question dialog act indicative of the user providing a request for a positive or negative response and the second dialog act is a second question dialog act indicative of the user providing a query, the determining of the respective priority orders comprises determining a priority order for the first sentence unit to be greater than a priority order for the second sentence unit.

17. The method of claim 1, wherein when both the first and second dialog acts are notification dialog acts indicative of the user providing information, the processing of the first and second sentence units comprises generating a response, to be provided to the user, for querying an intention of the user.

18. A device, comprising:

a memory configured to store instructions; and at least one processor configured to execute the instructions to:

receive speech information, corresponding to speech of a user, including a plurality of sentence units;

identify a first sentence unit and a second sentence unit, of the plurality of sentence units, based on receiving the speech information;

extract a first dialog act indicative of an intention of the first sentence unit and a second dialog act indicative of an intention of the second sentence unit;

determine respective priority orders for the first and second sentence units based on the first and second dialog acts; and process the first and second sentence units in a sequence according to the respective priority orders, wherein when the first and second dialog acts are either both question dialog acts indicative of the user providing a query or both request dialog acts indicative of the user providing a request, the instructions to determine the respective priority orders further comprise instructions to:

determine a first dialogue frame used to process the first sentence unit and a second dialogue frame used to process the second sentence unit, the first and second dialogue frames being slot filling-based dialogue frames;

fill respective slots of the first and second dialogue frames with information included in the speech information;

assign a first priority order for the first sentence unit and a second priority order for the second sentence unit, the first priority order being higher than the second priority order when a first number of empty slots of the first dialogue frame is smaller than a second number of empty slots of the second dialogue frame, and wherein the instructions to process the first sentence unit and the second sentence unit in a sequence according to the respective priority orders further comprise instructions to:

process the first sentence unit having the first priority order by providing a first response sentence to the user for querying information corresponding to the empty slots of the first dialogue frame;

obtaining information from the user for filling the empty slots of the first dialogue frame, and processing the second sentence unit having the second priority order after processing the first sentence unit.

19. A non-transitory computer-readable medium configured to store one or more instructions that, when executed by one or more processors, cause the one or more processors to:

receive speech information, corresponding to speech of a user, including a plurality of sentence units;

identify a first sentence unit and a second sentence unit based on the speech information;

extract a first dialog act indicative of an intention of the first sentence unit and extract a second dialog act indicative of an intention of the second sentence unit;

determine respective priority orders for the first and second sentence units based on the first and second dialog acts; and process the first and second sentence units in a sequence according to the respective priority orders wherein when the first and second dialog acts are either both question dialog acts indicative of the user providing a query or both request dialog acts indicative of the user providing a request, the instructions to determine the respective priority orders further comprise instructions to:

determine a first dialogue frame used to process the first sentence unit and a second dialogue frame used to process the second sentence unit, the first and second dialogue frames being slot filling-based dialogue frames;

fill respective slots of the first and second dialogue frames with information included in the speech information;

assign a first priority order for the first sentence unit and a second priority order for the second sentence unit, the first priority order being higher than the second priority order when a first number of empty slots of the first dialogue frame is smaller than a second number of empty slots of the second dialogue frame, and wherein the instructions to process the first sentence unit and the second sentence unit in a sequence according to the respective priority orders further comprise instructions to:

process the first sentence unit having the first priority order by providing a first response sentence to the user for querying information corresponding to the empty slots of the first dialogue frame;

obtaining information from the user for filling the empty slots of the first dialogue frame, and processing the second sentence unit having the second priority order after processing the first sentence unit.

* * * * *